United States Patent [19]

Pedrazzini et al.

[11] Patent Number: 5,629,610
[45] Date of Patent: May 13, 1997

[54] DUAL THRESHOLD CURRENT MODE DIGITAL PWM CONTROLLER

[75] Inventors: Giorgio Pedrazzini, Pavia; Giuseppe Scrocchi, Besana in Brianza; Paolo Cordini, Pavia; Domenico Rossi, Cilavegna, all of Italy

[73] Assignee: SGS-Thomson Microelectronics S.r.l., Agrate Brianza, Italy

[21] Appl. No.: 436,947

[22] Filed: May 8, 1995

[30] Foreign Application Priority Data

May 6, 1994 [EP] European Pat. Off. .............. 94830217

[51] Int. Cl.$^6$ ................................................ G05F 1/563
[52] U.S. Cl. ........................... 323/283; 323/284; 323/285
[58] Field of Search ................................. 323/282, 283, 323/284, 285, 299, 351

[56] References Cited

U.S. PATENT DOCUMENTS

| | | | |
|---|---|---|---|
| 4,816,982 | 3/1989 | Severinsky | 323/285 |
| 4,849,683 | 7/1989 | Flolid | 323/284 |
| 4,975,820 | 12/1990 | Szepesi | 323/282 |
| 5,029,269 | 7/1991 | Elliott et al. | 323/284 |
| 5,084,666 | 1/1992 | Bolash | 323/283 |
| 5,138,250 | 8/1992 | Capel | 323/283 |
| 5,192,906 | 3/1993 | Nathan | 323/284 |
| 5,245,526 | 9/1993 | Balakrishnan et al. | 323/284 |
| 5,477,132 | 12/1995 | Canter et al. | 323/282 |
| 5,490,055 | 2/1996 | Boylan et al. | 323/285 |
| 5,528,125 | 6/1996 | Marshall et al. | 323/282 |

FOREIGN PATENT DOCUMENTS

| | | | |
|---|---|---|---|
| 0415244 | 3/1991 | European Pat. Off. | ....... H02M 3/156 |
| 0556663 | 8/1993 | European Pat. Off. | ........ G05F 1/565 |

*Primary Examiner*—Jeffrey L. Sterrett

[57] ABSTRACT

A fully digital, current mode, PWM control is realized by employing two distinct comparators, both reading the voltage drop on a sensing resistance. The first comparator exerts an open-loop current mode control. The second comparator, establishing a second higher current threshold than the current threshold set by the first comparator, triggers a disabling circuit of the output power transistor for a preset period of time, when the current level through the output stage uncontrollably rises beyond the second threshold. This may occur because of an insufficient discharge from the load circuit inductance during off-phases of the output power transistor of the extra energy stored during switching delay periods of the first (open loop control) comparator. The frequency of the sequence of bursts may be precisely controlled to be well outside the frequency range of interest to prevent disturbances.

22 Claims, 3 Drawing Sheets

DUAL THRESHOLD CURRENT MODE DIGITAL PWM CONTROLLER

CROSS-REFERENCE TO RELATED APPLICATION

This application claims priority from EP 94830217.9, filed May. 6, 1994, which is hereby incorporated by reference. However, the content of the present application is not necessarily identical to that of the priority application.

BACKGROUND AND SUMMARY OF THE INVENTION

The present invention relates to a current mode, digital, PWM control circuit of an output stage, the switching frequencies of which may be forecast and/or predetermined in relation to the operating conditions of the circuit. PWM (Pulse Width Modulation) mode controlled output stages are widely used in a large variety of electronic systems, in particular in driving systems for electric motors, displays, actuators of various kinds, DC—DC converters and battery chargers.

The control circuit drives a power switch (high-side driver or low-side driver), that is commonly constituted by a power transistor, often a field effect transistor, for example a MOSFET, suitable to connect to a supply rail a load circuit, external to the integrated circuit. Commonly the output power transistor is driven by a bistable logic circuit (e.g. a flip-flop). In case of MOSFET type transistors, special techniques such as for example the so-called bootstrapping technique, are employed for optimizing the electrical efficiency of the power switch, by driving the gate of the transistor with a "boosted" voltage (higher than the supply voltage, that is higher than the drain voltage).

Normally the PWM control circuit implements a control of the current flowing through the output stage (current mode control). Optionally, the control circuit may also exert a control of the output voltage, for example in order to limit the voltage applied to an external load. The two control signals (voltage mode and current mode) may be combined logically in order to enable or disable the switching of the power transistor.

To a clock input of the bistable circuit that drives the power switch (for example a D-type flip-flop), may be fed a PWM clock signal, having a certain frequency ($f_{PWM}$), that may be derived from a general system's clock of a stable frequency ($f_o$), for example by employing a frequency divider circuit (1/N). Turn-on control (enabling/disabling switching at the $f_{PWM}$ frequency) of the power switch may practically be implemented by a logic signal fed to a "reset" input of the driving flip-flop. Such a control signal may be produced by a logic circuit having a plurality of inputs driven by an equal number of logic control signals, for example a logic NOR gate.

According to a classical approach, the current mode control is implemented by employing: a) an error amplifier capable of reading the voltage drop across a sensing resistance, b) a comparator capable of producing a logic level signal and c) a compensation network for the feedback loop. Of course the logic signal that is generated by the comparator may be fed to an input of the logic circuit that controls a reset node of the bistable driving circuit.

This classical approach requires a compensation network and control signals having a particular shape (triangular shape) and may be burdensome in terms of circuit complexity.

It is a main object of the present invention to provide a PWM control circuit implementing a current mode control in a fully digital mode and which does not require the use of an error amplifier.

This objective is fully met by the control circuit of the present invention which is characterized by the fact that it employs two distinct comparators essentially having a different threshold, each comparator being connected in a way as to be able to read the voltage on a sensing resistance, representative of the current flowing through the power switch. This inventive control circuit is useful for battery chargers and DC-to-DC converters, especially battery chargers. A noteworthy advantage of the invention in applications such as battery chargers and converters is that complex feedback loops including capacitances are not required.

A first comparator, having a certain threshold in terms of the level of the current flowing in the power switch, has an output directly connected to a first input of a multi-input control logic circuit of the bistable driving circuit of the output transistor, thus implementing a control system that, in a steady state condition, is essentially an open loop system, as will be described further on in this specification.

The second comparator, having a threshold (in terms of the level of the current flowing in the power switch, higher than the threshold of the first comparator, has an output connected to a second input of the control logic circuit of the driving bistable circuit of the output power transistor. The output of the second comparator also drives a logic circuit capable of generating a turn-on disabling logic signal of the output transistor for a preset period of time following an overtaking of said second current threshold. Also this $n^{th}$ control logic signal is fed to an $n^{th}$ input of the control logic circuit of the driving bistable circuit of the output transistor. The multi-input control logic circuit may be constituted by a logic NOR gate or by an equivalent logic circuit.

The current mode control circuit of the invention is capable of handling the occurrence of operating conditions such that, in presence of a long lasting relatively low output voltage, too low for allowing a sufficiently fast and essentially complete discharge of reactive energy through a current recirculation (that is an excessively slow discharge process because of the low recirculation voltage) during off-phases of the output power transistor, would cause an uncontrolled gradual rise of the current. Upon the intervention of the second comparator, when a preset second threshold of the current level is reached, the output transistor is forcibly maintained in an off condition for a preset period of time, which may be sufficient to discharge the accumulated energy. After termination of said preset disabling interval, the circuit "re-attempts" switching by turning on again the output power transistor.

Notwithstanding the fact that a functional, fully digital current mode control may be implemented by employing an hysteresis comparator for reading the level of the output current, such a solution does not permit any control of the switching frequency within the time interval when the current remains in the hysteresis range of the comparator. This may cause the circuit to switch at frequencies that may fall within the audio band or in other bands of interest, and which therefore may produce disturbances in audio systems or similar problems in other types of systems due to the indetermination of the switching frequencies within the hysteresis band of the comparator.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
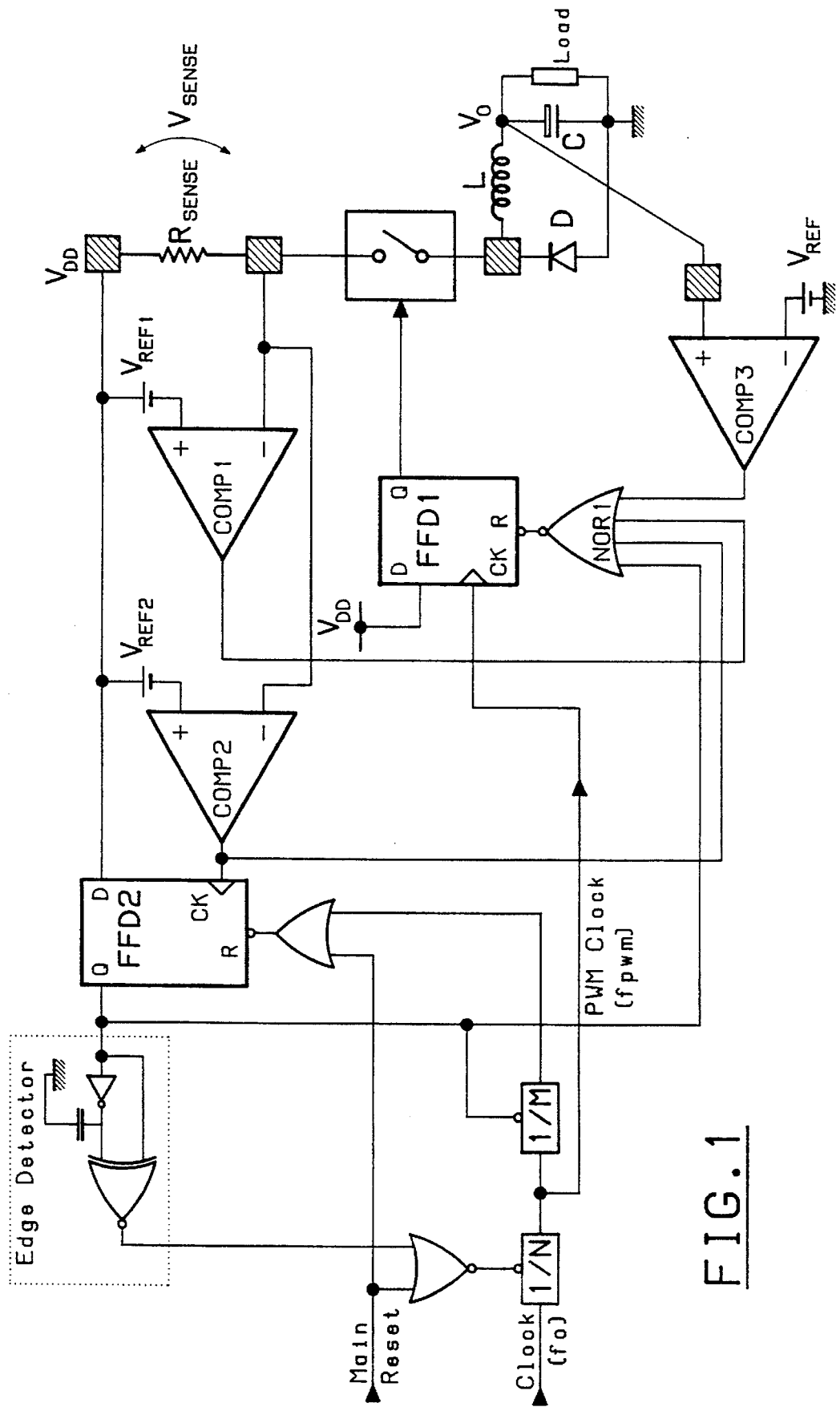
FIG. 1 is a basic block diagram of a circuit made according to the invention.

The numerous innovative teachings of the present application will be described with particular reference to the presently preferred embodiment (by way of example, and not of limitation), in which:

With reference to FIG. 1, the depicted output stage is of the so-called high-side driver type. Of course, the control circuit of the invention is useful also for an output stage configured as a low-side driver.

Typically, the external load circuit may comprise, as shown in the example, an LC circuit, capable of producing an output voltage Vo on a load, and a diode D for recirculating the discharge current of the energy stored in the inductance L, during off phases of the output power transistor M1 (i.e. during the intervals when the power switch is open).

In order to implement the necessary current mode control, the circuit comprises a sensing resistance Rsense which, in the considered example, is functionally connected in series with the power transistor M1 (power switch).

According to a common digital driving technique of the power transistor (switch) M1, the control terminal of the latter may be driven by a bistable circuit, for example a D-type flip-flop, FFD1, having an input D connected to a supply node VDD, a clock input CK to which a PWN clock signal is applied having a certain frequency $f_{PWM}$. The PWM clock signal may be derived from a general system's clock having a relatively high frequency $f_o$, by employing an appropriate frequency divider (1/N).

The turn on control of the output power transistor M1 is implemented by a logic signal fed to a reset input R of the bistable circuit (FFD 1). The logic control signal is produced on an output of a multi-input logic circuit, for example a logic gate, NOR1.

If the output power transistor M1 is a field effect transistor, for example a MOSFET, an appropriate bootstrapping or boost circuit may be employed for driving the gate of the output power transistor (through a Q output of the driving flip-flop FFD1) with a boosted voltage (typically higher than the drain voltage of the transistor).

Figure 2:
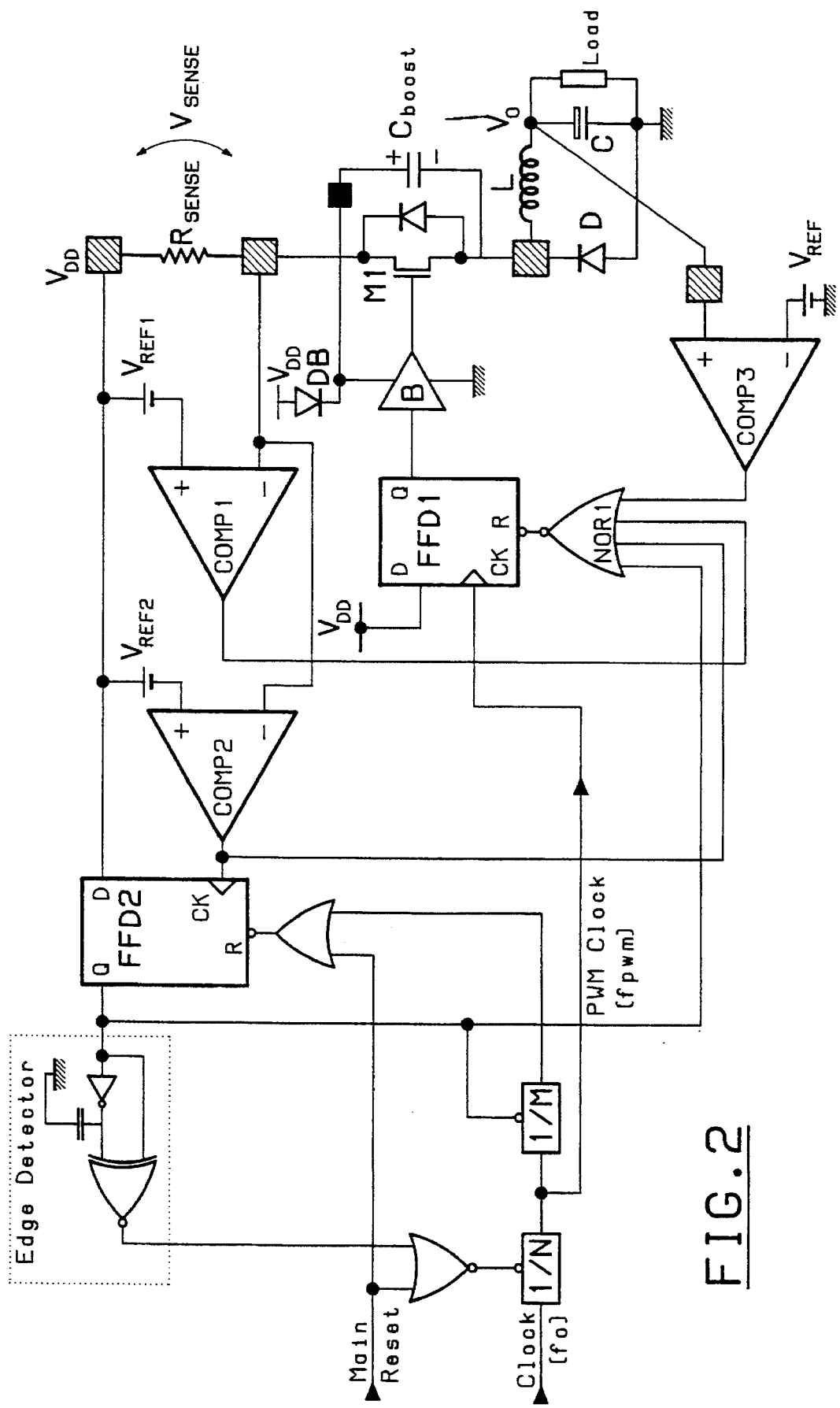
FIG. 2 shows a circuit of the invention using a MOSFET as an output power switch.

The diagram of FIG. 2 shows the use of a MOSFET as the output power stage M1, provided with a bootstrap circuit formed by a bootstrap capacitor Cboost, the charge diode DB and the driving stage B, driven by the Q output of the bistable circuit FFD1.

An "overvoltage" control may be implemented in a conventional way by employing a comparator COMP3 capable of changing its output state as the output voltage Vo becomes higher than a preset threshold $V_{REF}$. The output of the comparator COMP3 may be directly connected to a first input of the logic circuit NOR1.

According to the present invention, the fully digital, current mode control is implemented in the manner described hereinbelow and by referring also to the diagrams of FIG. 3.

The input current level is read in the form of a voltage drop (Vsense) on a sensing resistance Rsense by a first comparator COMP1, whose output changes state when the voltage Vsense becomes higher than a first preset threshold $V_{REF1}$.

In practice, by referring to the diagram of FIG. 2, the comparator COMP1 establishes a first current threshold I1. The output of the comparator COMP1 may be directly connected to a second input of the logic circuit NOR1.

An "open loop" control of the current, as implemented by the comparator COMP1, because of an inevitable delay of the comparator in changing its output state, may, under certain load conditions, determine a gradual uncontrolled increase of the level of the output current. This occurs because of an insufficient discharge of the energy stored in the inductor L during the off phases of the output transistor M1, that is during recirculation phases of a discharge current of the inductance L.

Figure 3:
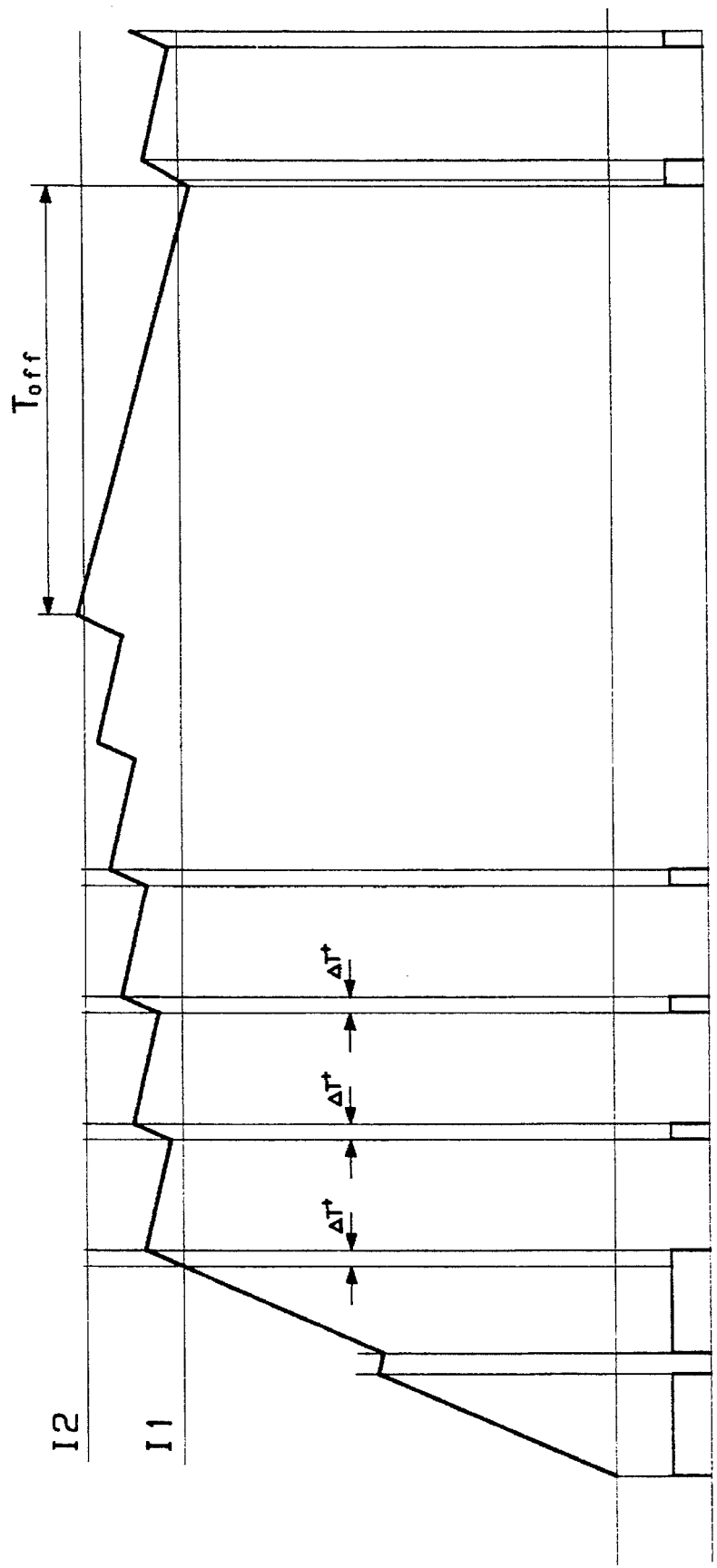
FIG. 3 is a diagram showing the operation of the circuit of the invention.

More precisely, by referring to the diagram of FIG. 3, the "amount" of current (i.e. of electrical charge) ($\Delta I^+$), which inevitably continues to flow through the output stage during the delay in changing its output state of the comparator COMP1 ($T_{delay}$), should be equal to the "amount" of current ($\Delta I^-$) (i.e. of electrical charge) that recirculates through the diode D, thus completely discharging the energy stored in the inductance L during the subsequent off "phase" of the power transistor M1: that is, $\Delta I^+ = \Delta I^-$.

In view of the fact that the voltage on the inductance L is driven by $V = L\delta i/\delta t$, that is $V = L\Delta I/\Delta T$, then:

$$\Delta I = \Delta V \Delta T / L$$

therefore:

$$\Delta I^+ = \frac{VDD - Vsat - Vo}{L} \quad Ton = \frac{Vo + Vdiode}{L} \quad Toff = \Delta I^-$$

where Vsat represents the voltage drop on the power MOSFET M1 of the output stage and Vdiode represents the voltage drop on the recirculation diode D.

By simplifying the last expression, $$(Vdd - Vsat - Vo) \frac{Ton}{Toff} = Vo + Vdiode$$

Therefore the energy stored during the switching delay of the comparator should be discharged during the ensuing off phase of the power transistor (Toff).

By assuming:

$$VDD - Vsat - Vo = VL \text{ and } Vo + Vdiode = Vric,$$

in order to ensure a correct operation, the following relationship should always be verified:

$$Tdelay \times V_L < Toff \times Vric$$

The diagram of FIG. 3 practically depicts the above described technical problem.

The first part of the diagram of FIG. 2 shows a typical rise to a steady state level by the output current (for example when the circuit is first switched on). The rise cycle shown pertains to the use of a bootstrap circuit for overdriving the gate of the power transistor and therefore, during the initial rise of the level of the current, short cut-off periods of the output power transistor must occur.

Below the current diagram, the wave form of the driving signal of the power transistor, characterized by a sequence of "bursts" of impulses at the PWM clock frequency ($f_{PWM}$), is shown.

When the level of the output current becomes higher than the first current threshold I1, the comparator COMP1 changes state with a certain intrinsic delay, Tdelay. During such an inevitable transition delay, a certain current continues to flow through the output stage ($\Delta I^+$), thus continuing to charge the inductance L. Subsequently, the energy stored in the inductance L discharges through the recirculation diode D until the output power transistor turns-on again.

If, as discussed above, the output voltage Vo remains relatively low, the discharge slope of the energy stored in the inductance L during a turn-off delay period may be excessively small and cause an incomplete discharging of the stored energy.

On the other hand, the connection of the sensing resistance Rsense in series with the output transistor M1 (i.e. in series with the drain of the transistor M1), implies that, upon the turning-off of the output transistor M1, the voltage drop Vsense on Rsense becomes null, causing a new change of state of the comparator COMP1, as to command again the turning-on of the output transistor M1, irrespectively of the actual level reached by the output current.

Therefore, upon the nullification of the Vsense information pursuant the turning-off of the output transistor M1, a number of turn-on attempts, at the switching frequency $f_{PWM}$ of the clock signal PWM, occur in succession. Each of these turn-on "impulses" at a $f_{PWM}$ frequency will have a duration equivalent to the switching delay of the comparator COMP1. If the output voltage Vo remains at a relatively low level, the sequence of brief periods of conduction of the output transistor M1 leads to a slow drifting of the current level above the threshold I1 established by the comparator COMP1, missing a complete discharge of the energy pulses stored in the inductor L.

According to a fundamental aspect of the present invention, this drawback that is intrinsic of an open loop current mode control implemented by the first comparator COMP1, is eliminated by employing a second comparator COMP2, having a triggering threshold established by $V_{REF2}$ that is higher than the threshold $V_{REF1}$ of the first comparator COMP1. This second current threshold I2 is depicted in terms of output current level in the diagram of FIG. 3.

The output of the second comparator COMP2 may be directly connected to a third input of the logic circuit NOR1.

The same output node of the second comparator COMP2 controls also a circuit capable of generating a fourth logic control signal which is fed to a fourth input of the logic circuit NOR1, thus fixing a certain disabling period of the turning-on of the output power transistor M1 (forced Toff).

With reference to the diagram of FIG. 3, the effect of such a circuit, driven by the output of the second comparator COMP2, is such that whenever the level of the current flowing through the output stage, through the above described mechanism, rises beyond the value of the second threshold I2, the power transistor M1 will be forcibly kept in an off condition for a preset period of time (forced Toff). During this forced cut-off period, the excess of energy that has been accumulating itself in the inductance L may discharge. The duration of the forced off period Toff may be designed to be sufficiently long to discharge the energy that has accumulated in the inductance L because of insufficient discharging during the off phases of the power transistor, so as to reduce the level of the current below the first threshold I1.

By referring again to the diagram of FIG. 1, the circuit that generates said fourth control logic signal of forced disabling of the turning-on of the output transistor M1 may be realized by employing a second bistable circuit, for example a D-type flip-flop, FFD2, and connecting its D-input to the supply rail VDD and its Q output to the fourth input of the logic circuit NOR1.

The bistable circuit FFD2 is set by a change of state of the overcurrent comparator COMP2, for example by connecting the output of the comparator COMP2 to the clock input CK of the FFD2 flip-flop.

Therefore, during the time in which the flip-flop remains in a set condition, the output Q connected to the fourth input of the logic circuit NOR1 prevents the power transistor M1 from being turned on by the driving flip-flop FFD 1.

The reset of the FFD2 flip-flop is automatically effected after a preset period of time, which may be established by a divider circuit (1/M), which may be activated by a set condition of the FFD2 flip-flop, reset of FFD2 will occur after a pre-established number of clock cycles. In the depicted example, reset of FFD2 will occur after a number of clock's cycles given by the product N×M.

When, as in the shown examples, a system's clock frequency divider circuit (1/N) is used for generating the PWM clock frequency $f_{PWM}$, it is important to reset the first divider circuit (1/N) at the set instant of the FFD2 flip-flop. This may be obtained by employing an edge detector circuit capable of generating a pulse of a duration sufficient to reset the first divider circuit (1/N).

After a pre-established number of clock's cycles, equivalent to N×M the second divider circuit (1/N) generates a reset signal for the FFD2 flip-flop, the output Q of which switches again to zero, thus enabling again the turning-on of the output power transistor M1 and disabling the divider circuit 1/M (no longer necessary for the operation of the circuit).

Clearly, the second comparator COMP2 and consequently also the circuit driven by the latter and capable to determine a certain forced disable time (forced Toff) of the power transistor M1, will intervene only when the output voltage Vo remains relatively low, for example at the start-up of the circuit. In practice, at start-up, a certain number of interventions by COMP2, may occur in succession.

Under normal steady state conditions, the output voltage Vo will assume a level such as to determine a recirculation voltage of the discharge current of the inductance L, sufficiently high to ensure a complete discharge of the energy stored during the turn-off delay of the comparator COMP1. Therefore, the level of the current through the output stage will cease to rise beyond the value established by the first threshold I1, and the comparator COMP2 and the circuit that determines a forced disabling of the output power transistor for a preset period of time (forced Toff) will remain inactive. The current mode control will continue to be exerted solely by the comparator COMP1 in an open loop condition, until conditions that may cause the rising of the level of the current above the second current threshold I2 occur again.

Figure 4:
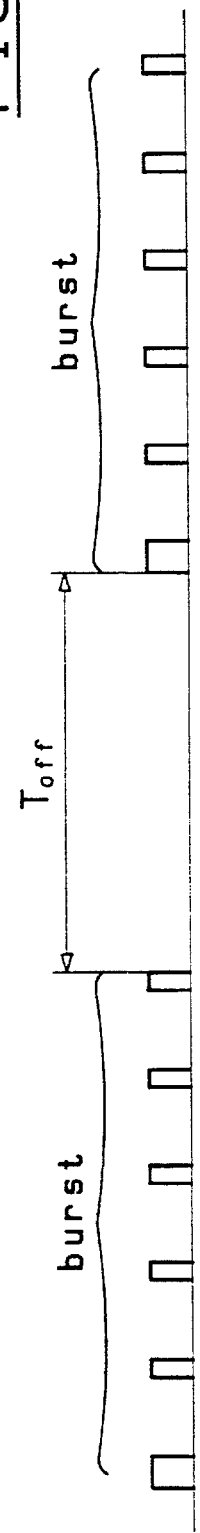
FIG. 4 shows typical signals of the circuit of the invention.

As shown by the form of the driving signal depicted in FIG. 4, the "turn-on" bursts at the $f_{PWM}$ switching frequency of the power transistor will occur with a typical sequence which may be exactly forecast. Each sequence is separated by forced off periods. The control circuit may be easily designed so as to prevent bursts from occurring with an undesired frequency.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

For example, the invention has been disclosed for use in a current mode control, but it could also be adapted to use two comparators for voltage-mode control.

Alternatively and less preferably, the disclosed invention may be used in buck and/or boost converters.

What is claimed is:

1. A method for driving a power output terminal, comprising the steps of:
   (a.) sensing an input current, and accordingly
   (b.) using a first open loop, activating a switching transistor when said input current falls below a first threshold, and
   (c.) using a second open loop, disabling said switching transistor when said input current rises above a second threshold.

2. The method of claim 1, wherein said switching transistor is a power field effect transistor.

3. The method of claim 1, wherein said switching transistor is a power field effect transistor having one terminal thereof connected to a boosting capacitor, which is connected in a charge-pumping configuration to provide a boosted supply voltage to the gate of said power transistor.

4. A digital, current mode, PWM control circuit for an output stage comprising a sensing resistance of an input current connected in series with a power switch of the output stage, a bistable driving circuit having a clock input suitable to receive a PWM clock signal and a reset input driven by an output of a multi-input logic circuit, comprising:
   at least a first comparator of the voltage on said sensing resistance having a certain threshold and an output connected to a first input of said logic circuit;
   at least a second comparator of the voltage on said sensing resistance, having a threshold higher than the threshold of said first comparator and an output connected to a second input of said logic circuit;
   means driven by the output of said second comparator capable of generating a logic signal for disabling said power switch for a preset period of time, fed to a third input of said logic circuit.

5. A control circuit as defined in claim 4, wherein said means comprise a bistable logic circuit having at least a reset input driven by a time counter which is activated by said disabling logic signal generated on an output of said bistable circuit.

6. A control circuit as defined in claim 5, wherein said bistable circuit is a D-type flip-flop having an input connected to a supply node, an output connected to said third input of said logic circuit, an input connected to the output of said second comparator and a reset input driven by said time counter.

7. A control circuit as defined in claim 6, wherein said time counter comprises a clock frequency divider circuit, which is enabled by the signal present on said output of said flip-flop and capable of generating a reset signal of said flip-flop, after a preset number of clock's cycles from a transition instant of said output.

8. A control circuit as defined in claim 7, wherein the clock frequency divider circuit comprises:
   a first clock frequency divider circuit generating a PWM clock frequency signal which is fed to said clock input of said driving bistable circuit;
   said PWM clock signal being applied to the input of a second clock frequency divider circuit activated by the transition of said output of said flip-flop capable of generating a reset signal for said flip-flop after a preset number of cycles.

9. A control circuit as defined in claim 8, further comprising an edge detector of a transition from a low logic state to a high logic state of said output of said flip-flop and capable of generating a reset signal fed to a reset input of said clock frequency divider circuit.

10. A control circuit as defined in claim 4, wherein said driving bistable circuit is a D-type flip-flop.

11. A control circuit as defined in claim 4, wherein said multi-input logic circuit is a NOR gate.

12. A control circuit as defined in claim 4, further comprising a comparator for controlling the output voltage, which generates an overvoltage limiting logic signal applicable to a fourth input of said logic circuit.

13. A switched power output subsystem, comprising:
   a switching transistor operatively connected between a first power supply terminal and a power output terminal;
   at least one reactance, connected to provide a smoothed current at said output terminal;
   a pulse generation circuit, operatively connected to apply pulses to a control terminal of said transistor in dependence on at least one control signal;
   a first control loop which compares the current at said first power supply terminal against a first threshold and selectively activates said pulse generation circuit accordingly;
   a second control loop which compares the current at said first power supply terminal against a second threshold and selectively blocks said pulse generation circuit accordingly.

14. The subsystem of claim 13, wherein said reactance comprises an inductor.

15. The subsystem of claim 13, wherein said reactance is an LC circuit.

16. The subsystem of claim 13, wherein said switching transistor is a power field effect transistor.

17. The subsystem of claim 13, wherein said switching transistor is a power field effect transistor having one terminal thereof connected to a boosting capacitor, which is connected in a charge-pumping configuration to provide a boosted supply voltage to the gate of said power transistor.

18. A switched power output subsystem, comprising:
   a switching transistor operatively connected between a first power supply terminal and a power output terminal;
   at least one reactance, connected to provide a smoothed current at said output terminal;
   a pulse generation circuit, operatively connected to apply fixed-frequency variable-duration pulses to a control terminal of said transistor in dependence on at least one control signal;
   a first control loop which compares the current at said first power supply terminal against a first threshold and selectively activates said pulse generation circuit accordingly;
   a second control loop which compares the current at said first power supply terminal against a second threshold and selectively blocks said pulse generation circuit against activation by said first control loop accordingly;
   a third control loop which monitors the voltage at said output terminal and selectively activates said pulse generation circuit accordingly;

wherein said first and second control loops are both open loops.

19. The subsystem of claim 18, wherein said reactance is an LC circuit.

20. The subsystem of claim 18, wherein said switching transistor is a power field effect transistor.

21. The subsystem of claim 18, wherein said switching transistor is a power field effect transistor having one terminal thereof connected to a boosting capacitor, which is connected in a charge-pumping configuration to provide a boosted supply voltage to the gate of said power transistor.

22. The subsystem of claim 18, wherein said reactance comprises an inductor.

* * * * *